(12) United States Patent
Kim et al.

(10) Patent No.: US 10,094,716 B2
(45) Date of Patent: Oct. 9, 2018

(54) STATOR SLOT TEMPERATURE SENSOR AND METHOD OF MANUFACTURING THE SAME

(71) Applicant: DOOSAN HEAVY INDUSTRIES & CONSTRUCTION CO., LTD., Changwon-si, Gyeongsangnam-do (KR)

(72) Inventors: Young Wook Kim, Changwon-si (KR); Sung Jae Lee, Changwon-si (KR); Dong Uk Jeong, Busan (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 230 days.

(21) Appl. No.: 14/974,315

(22) Filed: Dec. 18, 2015

(65) Prior Publication Data

US 2016/0178451 A1 Jun. 23, 2016

(30) Foreign Application Priority Data

Dec. 18, 2014 (KR) ........................ 10-2014-0183571

(51) Int. Cl.
*G01K 7/18* (2006.01)
*G01K 7/16* (2006.01)

(52) U.S. Cl.
CPC .................... *G01K 7/18* (2013.01); *G01K 7/16* (2013.01)

(58) Field of Classification Search
None
See application file for complete search history.

(56) References Cited

U.S. PATENT DOCUMENTS

| 2007/0132541 | A1 | 6/2007 | Sato | |
|---|---|---|---|---|
| 2007/0258506 | A1* | 11/2007 | Schwagerman | G01K 1/08 374/179 |
| 2009/0240249 | A1* | 9/2009 | Chan | A61B 18/1492 606/41 |
| 2012/0026482 | A1* | 2/2012 | Dailey | G01D 5/35303 356/43 |
| 2013/0156071 | A1 | 6/2013 | Wan et al. | |
| 2014/0123766 | A1 | 5/2014 | Bach | |

FOREIGN PATENT DOCUMENTS

| DE | 102011008179 A1 | 7/2012 |
|---|---|---|
| DE | 102011085064 A1 | 4/2013 |
| JP | 5087641 B2 | 9/2012 |
| KR | 1020030096866 A | 12/2003 |
| KR | 1020070016060 A | 2/2007 |

OTHER PUBLICATIONS

DE102011008179—translation.*
European Search Report corresponding to European Patent Application No. 15200008.9, dated Apr. 25, 2016.
Korean Notice of Allowance corresponding to Korean Application No. 2014-0183571, dated Feb. 25, 2016.

* cited by examiner

*Primary Examiner* — Lisa Caputo
*Assistant Examiner* — Nasir U Ahmed
(74) *Attorney, Agent, or Firm* — Sughrue Mion, PLLC

(57) ABSTRACT

Disclosed herein is a temperature sensor assembly. The temperature sensor assembly comprises an element that is a sensing resistor, a pair of parallel lead wires connected to the element, a laminate configured to mechanically protect and surround the element and the lead wires, and lead wire drawn out parts extended and protruded from the lead wires to the outside of the laminate.

15 Claims, 4 Drawing Sheets

STATOR SLOT TEMPERATURE SENSOR AND METHOD OF MANUFACTURING THE SAME

CROSS REFERENCE TO RELATED APPLICATION

The present application claims the benefit of Korean Patent Application No. 10-2014-0183571 filed in the Korean Intellectual Property Office on Dec. 18, 2014, the entire contents of which are incorporated herein by reference.

BACKGROUND

1. Technical Field

The present disclosure relates to a stator slot temperature sensor assembly and a method of manufacturing the same and, more particularly, to a stator slot temperature sensor assembly including a flexible substrate and a laminate slot and a method of manufacturing the same.

2. Description of the Related Art

In general, the slot of the stator core of a power generator includes a temperature sensor for continuously monitoring the state in order to prevent overheating or a undesirable state.

FIG. 1 is a perspective view of a conventional stator slot temperature sensor assembly, and FIG. 2 is a cross-sectional view of the conventional stator slot temperature sensor assembly.

Referring to FIGS. 1 and 2, in the conventional stator slot temperature sensor assembly, a temperature sensor is formed between the top bar and bottom bar of a stator slot. The temperature sensor is a sensing resistor (RTD), and includes an element made of platinum and configured to have resistance changing depending on a temperature, a pair of parallel lead wires connected to the element, a laminate configured to mechanically protect and surround the element and the lead wire, and a lead wire drawn out part extended and protruded from the lead wire to the outside of the laminate.

The laminate is received in the element. A pair of the elements is received in a single slot in parallel, and resin is attached to the top thereof. The lead wire is extended to the lead wire drawn out part which is curved from one end of the laminate at 90 degrees and drawn.

The lead wire and the element are coupled by soldering. Furthermore, the drawn out part and an external conducting wire connected to an external circuit are coupled by soldering.

The conventional temperature sensor has a problem in that external pressure is applied when the temperature sensor is placed and assembled between the top bar and bottom bar of the stator slot and the external pressure is applied to the element or the lead wire, resulting in disconnection. Major causes of such disconnection may include disconnection occurring because the structure of the laminate and the resin forming the laminate is inefficient to protect the element or the lead wire, the disconnection of the lead wire generated due to the external pressure if the soldering is excessive, and disconnection attributable to a reduction of mechanical strength occurring because the lead wire extended to the drawn out part is subject to an excessive amount of bending, for example, when the lead wire is bent 90 degrees.

SUMMARY

Embodiments of the present disclosure are directed to solving the problems of the conventional stator slot temperature sensor assembly and a method of manufacturing the same by improving the shape of a laminate, mediating a connection unit between lead wires or between a lead wire and an element using a flexible substrate, and changing the angle of a lead wire extended to a drawn out part.

In accordance with an aspect of the present disclosure, there may be provided a stator slot temperature sensor assembly, which is placed between a plurality of stator coils stacked in a stator slot and comprises an element, a lead wire connected to the element, a laminate configured to surround the element and the lead wire, and a lead wire drawn out part extended and protruded from the lead wire to the outside of the laminate.

Furthermore, the laminate may comprise element slots respectively configured to accommodate a pair of the elements and lead wire slots extended from the element slots and respectively configured to accommodate the pair of lead wires.

Furthermore, the element may be pressed in the element slot. Resin for fixing the element may be disposed over the element. The lead wire may be pressed in the lead wire slot. The resin for fixing the lead wire may be disposed over the lead wire.

Furthermore, the element and the lead wire may be coupled through the medium of a flexible substrate.

Furthermore, the lead wire drawn out part and an external conducting wire connected to an external circuit may be coupled through the medium of the flexible substrate.

Furthermore, the lead wire may have curvature and may be extended to the lead wire drawn out part.

Furthermore, the curvature may be 5 mm to 15 mm.

Likewise, the internal angle θ of a portion in which the lead wire comes in contact with the drawn out part may be more than 90 degrees and less than 180 degrees.

Furthermore, a pair of the elements having resistance changing depending on a temperature may be configured.

Furthermore, the element and the lead wire may be coupled through the medium of a flexible substrate. The flexible substrate may comprise a wiring pattern in which the element and the lead wire are coupled on a surface of an insulating base.

Furthermore, the lead wire drawn out part and an external conducting wire connected to an external circuit may be coupled through the medium of the flexible substrate. The flexible substrate may comprise a wiring pattern in which the element and the lead wire are coupled on a surface of an insulating base.

Furthermore, the element and the lead wire may be coupled through the medium of the flexible substrate. The flexible substrate may comprise a wiring pattern in which the element and the lead wire are coupled on a surface of the insulating base. An insulating film may be attached on a surface of the wiring pattern.

Furthermore, the lead wire drawn out part and an external conducting wire connected to an external circuit may be coupled through the medium of the flexible substrate. The flexible substrate may comprise a wiring pattern in which the element and the lead wire are coupled on a surface of an insulating base. An insulating film may be attached on a surface of the wiring pattern.

Furthermore, the element and the lead wire may be coupled through the medium of a flexible substrate. In this case, the flexible substrate may comprise a flexible printed circuit board, the flexible substrate may comprise a wiring pattern in which the element and the lead wire are coupled on a surface of an insulating base, and etching holes for preventing disconnection of the wiring pattern attributable to a tensile load may be formed in the wiring pattern.

Furthermore, the lead wire drawn out part and an external conducting wire connected to an external circuit may be coupled through the medium of the flexible substrate. The flexible substrate may comprise a flexible printed circuit board, the flexible substrate may comprise a wiring pattern in which the element and the lead wire are coupled on a surface of an insulating base, and etching holes for preventing disconnection of the wiring pattern attributable to a tensile load may be formed in the wiring pattern.

Furthermore, there may be provided a method of manufacturing a stator slot temperature sensor assembly, comprise a first step of processing an element slot and a lead wire slot in a laminate in the length direction of a base and a second step of matching up the element with the element slot, matching up the lead wire with the lead wire slot, and attaching resin on top of the element and on top of the lead wire.

Furthermore, the second step may comprise connecting the element to a terminal at the first end of the wiring pattern of a flexible printed circuit board by soldering and connecting the lead wire to a terminal at the second end of a wiring pattern of the flexible printed circuit board by soldering.

In this case, the flexible substrate may be fabricated by processing polymer in an insulating base, stacking electrolytic copper foils on top of the insulating base by pressurization and heating with an adhesive layer interposed between the electrolytic copper foils and the insulating base and processing the wiring pattern comprising etching holes by etching using photolithography, and attaching an insulating film on top of the wiring pattern other than the terminals.

Furthermore, the first step may comprise forming the internal angle of a section communicating with the outside of the laminate of the lead wire slot and the laminate so that the internal angle is more than 90 degrees and less than 180 degrees.

Furthermore, the first step may comprise forming a section communicating with the outside of the laminate of the lead wire slot so that the section has curvature.

DETAILED DESCRIPTION

Figure 1:
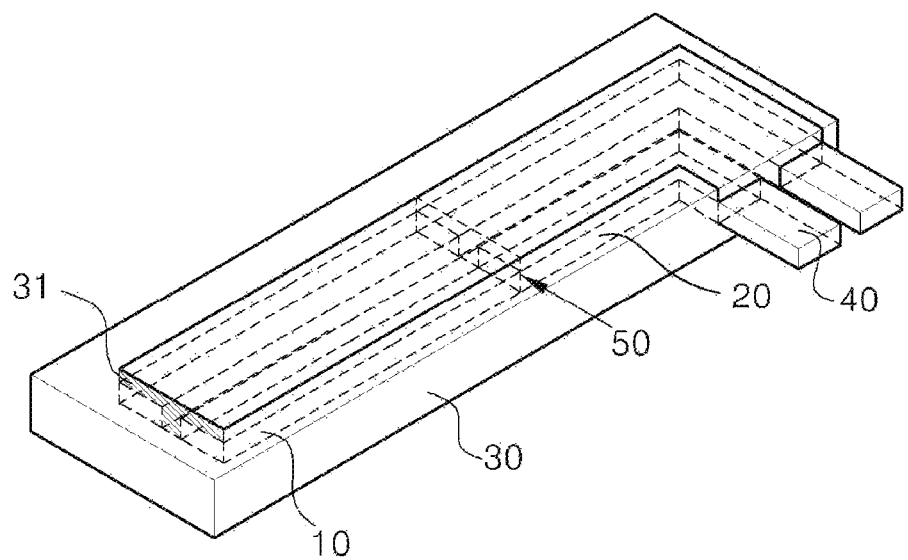
FIG. 1 is a perspective view showing a conventional stator slot temperature sensor assembly.
Figure 2:
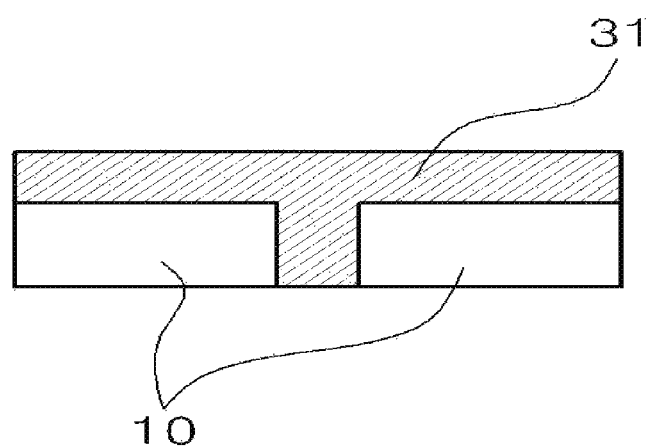
FIG. 2 is a side cross-sectional view on the side of an element of the conventional stator slot temperature sensor assembly.

Hereinafter, various embodiments of the present disclosure are described with reference to the accompanying drawings. It should be understood that differences between the embodiments of the present disclosure are not to be taken as a matter of mutually exclusivity. That is, it is to be understood that specific shapes, structures, and characteristics described in this specification may be implemented in other forms in connection with exemplary embodiments without departing from the spirit and scope of the present invention, and the position or arrangement of each element in each disclosed embodiment may be changed. The same or similar reference numerals are used to denote the same or similar elements throughout the drawings. The length, area, thickness, and shape of each element may have been enlarged for convenience sake.

Figure 3:
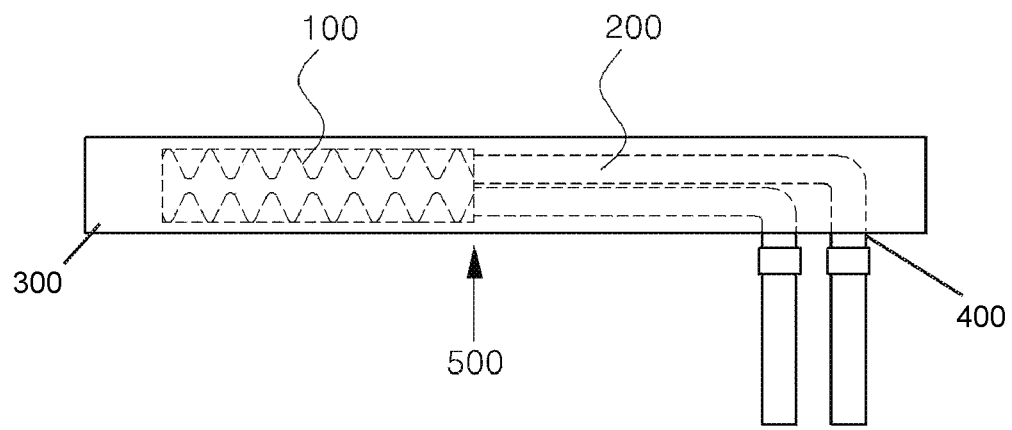
FIG. 3 is a plan view of a stator slot temperature sensor assembly in accordance with an embodiment of the present disclosure.
Figure 4:
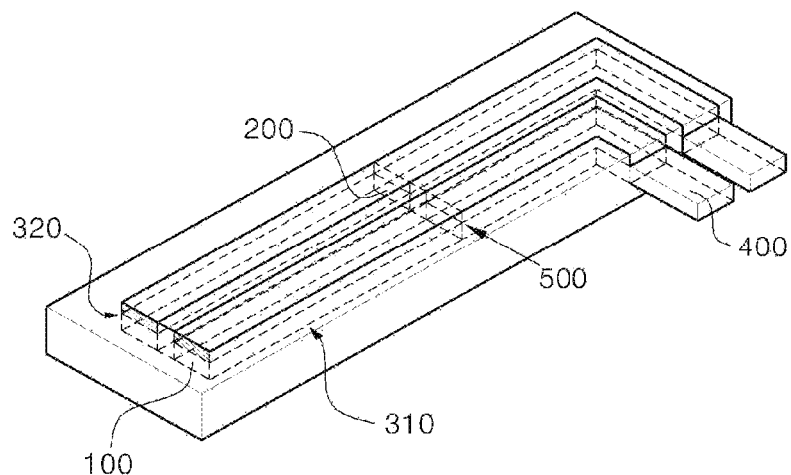
FIG. 4 is a perspective view of the stator slot temperature sensor assembly in accordance with an embodiment of the present disclosure.

FIG. 3 is a plan view of a stator slot temperature sensor assembly in accordance with an embodiment of the present disclosure, and FIG. 4 is a perspective view of the stator slot temperature sensor assembly in accordance with an embodiment of the present disclosure.

Figure 5:
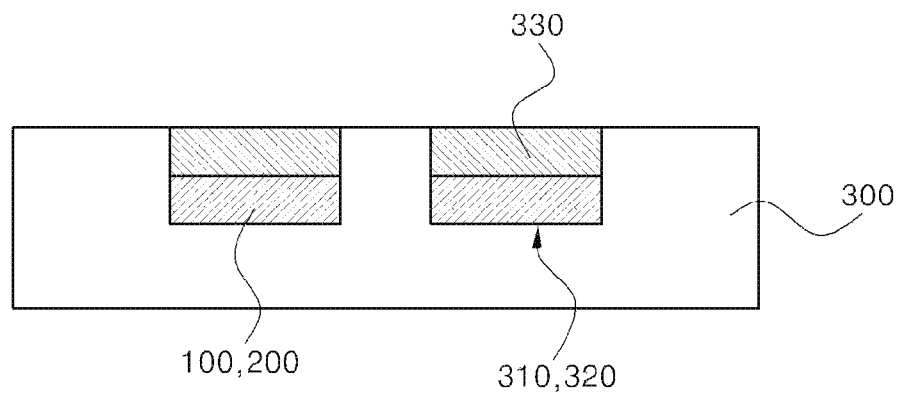
FIG. 5 is a cross-sectional view on the side of an element of the stator slot temperature sensor assembly in accordance with an embodiment of the present disclosure.

FIG. 5 is a cross-sectional view on the side of an element of the stator slot temperature sensor assembly in accordance with an embodiment of the present disclosure.

Figure 6:
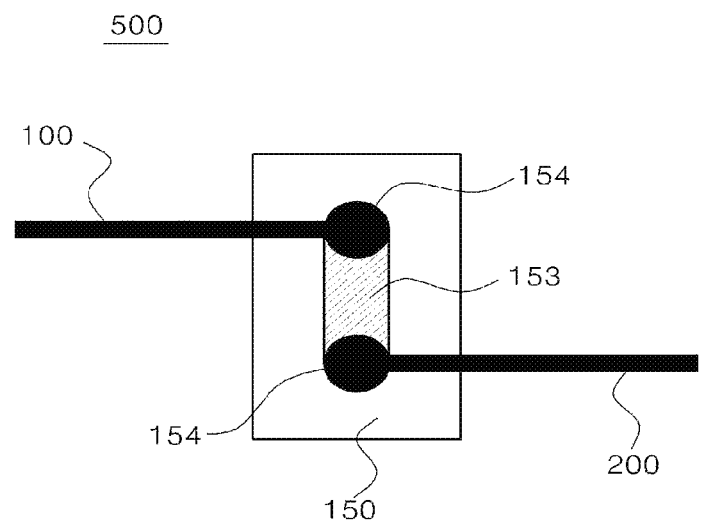
FIG. 6 shows the state in which a lead wire and an element are coupled in accordance with an embodiment of the present disclosure.

FIG. 6 is a schematic diagram showing the state in which a lead wire and an element are coupled in accordance with an embodiment of the present disclosure.

Figure 7:
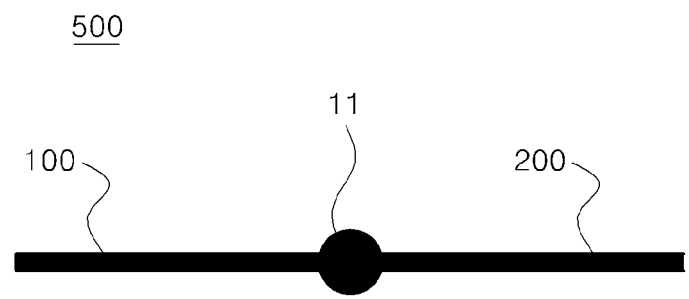
FIG. 7 shows the state in which a lead wire and an element are coupled in accordance with an embodiment of the present disclosure.

FIG. 7 is a schematic diagram showing the state in which a lead wire and an element are coupled in accordance with an embodiment of the present disclosure.

Figure 8:
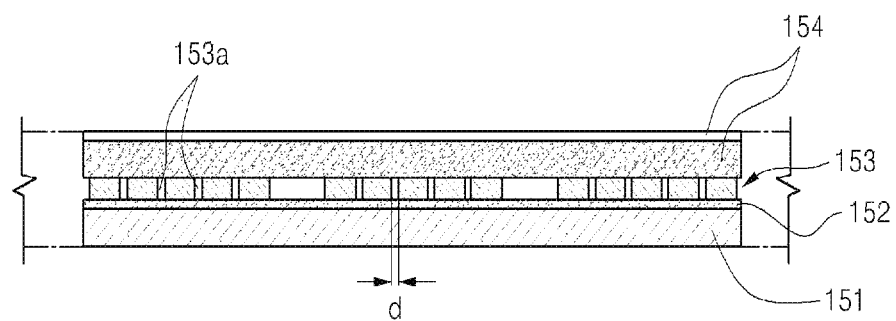
FIG. 8 shows the side of the flexible substrate of the stator slot temperature sensor assembly in accordance with an embodiment of the present disclosure.

FIG. 8 shows the side of the flexible substrate of the stator slot temperature sensor assembly in accordance with an embodiment of the present disclosure.

Figure 9:
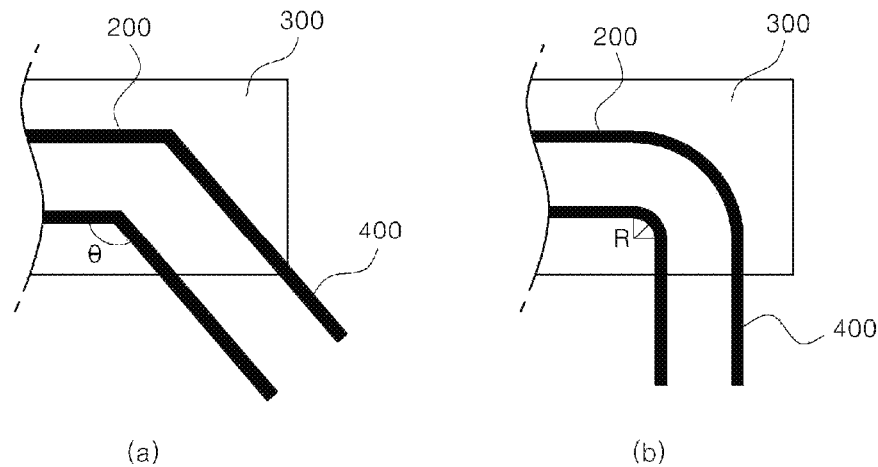
FIG. 9 shows the drawn out part of the stator slot temperature sensor assembly in accordance with an embodiment of the present disclosure.

FIG. 9 shows the drawn out part of the stator slot temperature sensor assembly in accordance with an embodiment of the present disclosure.

Referring to FIGS. 3 and 4, the stator slot temperature sensor assembly in accordance with an embodiment of the present disclosure comprises elements 100 that are sensing resistors, lead wires 200, a laminate 300, and lead wire drawn out parts 400. In another exemplary embodiment, the stator slot temperature sensor assembly may comprise internal conductors and external conductors in lieu of the lead wires 200 and the lead wire drawn out parts 400.

The element 100 is made of a material having resistance changing depending on a temperature. For example, the element 100 may be made of platinum.

A pair of the lead wires 200 is arranged in parallel in the length direction thereof and connected to the elements 100. When resistance of the elements 100 changes depending on an external temperature, the pair of lead wires 200 functions to connect the element 100 to an external circuit capable of measuring the value of the resistance.

The laminate 300 functions to surround the element 100 and the lead wires 200.

The lead wire drawn out parts 400 are extended and protruded from the lead wire 200 to the outside of the laminate 300.

Referring to FIG. 5, the laminate 300 may comprise element slots 310 respectively configured to accommodate a pair of the elements 100 and lead wire slots 320 respectively extended from the element slots 310 and configured to accommodate the pair of lead wires 200.

The elements 100 are pressed in the element slots 310. Resin 330 for fixing the elements 100 may be disposed on top of the elements 100. The lead wires 200 are pressed in the lead wire slots 320. The resin 330 for fixing the lead wires 200 may be disposed on top of the lead wires 200.

Unlike in a conventional stator slot temperature sensor assembly, disconnection can be minimized between the lead wire 200 and the element 100 attributable to pressure applied when the lead wires 200 are assembled with the respective lead wire slots 320, the elements 100 are assembled with the respective element slots 310, and the stator slot temperature sensor assembly is assembled between stator coils (not shown).

Referring to FIGS. 3 and 4, the element 100 and the lead wire 200 are coupled based on a connection unit 500. As shown in FIG. 7, in the connection unit 500, the element 100 and the lead wire 200 may be directly coupled through soldering 11. As shown in FIG. 6, the element 100 and the lead wire 200 may be coupled through the medium of a flexible substrate 150.

FIGS. 6 and 7 are schematic diagrams for illustrating a method of coupling the lead wire and the element. The coupling of the element 100 and the lead wire 200 in the connection unit 500 is schematically shown based on FIGS. 3 and 5.

Referring to FIGS. 6 and 8, the element 100 and the lead wire 200 may be coupled together through the medium of the flexible substrate 150. The lead wire drawn out part 400 and an external conducting wire connected to an external circuit may be coupled together through the medium of the flexible substrate 150.

The flexible substrate 150 is a flexible printed circuit board, and comprises a wiring pattern 153 configured to have the element 100 and the lead wire 200 coupled on a surface of an insulating base 151 and an insulating film 154 attached to a surface of the wiring pattern 153. Holes 153a for preventing the disconnection of the wiring pattern 153 attributable to a tensile load may be formed in the wiring pattern 153. The holes 153a may be formed using various methods, such as etching. Holes 153a may be formed with a diameter d. A foil 152 may be stacked on the insulating base 151 with an adhesive layer interposed between the foil and the insulating base 151. The foil 152 may be, for example, an electrolytic copper foil.

Accordingly, the soldering part of a conventional stator slot temperature sensor assembly can be prevented from being frequently disconnected. Coupling using a common flexible printed circuit board itself has some advantage in that it can prevent the disconnection of the wiring pattern 153. Additionally, in the flexible printed circuit board 150 in accordance with an embodiment of the present disclosure, the wiring pattern 153 is easily increased when a tensile load is applied to the wiring pattern 153 because the fine holes 153a are formed in the wiring pattern 153. Accordingly, there is an advantage in that the wiring pattern 153 is not cracked when it is deformed because a tensile load is repeatedly applied to the wiring pattern 153 or the wiring pattern 153 is extended to a specific range, but replaces the mechanical strength of soldering between the lead wires 200 or the soldering of the lead wire 200 and the element 100, thereby being capable of preventing disconnection.

Referring to FIG. 9(b), the lead wire 200 may have curvature R and may be extended to the lead wire drawn out part 400. The radius of curvature may be set to lie within a range, wherein the range is from 5 mm to 15 mm. In an exemplary embodiment the range is about 5 mm to about 15 mm.

In another embodiment, as shown in FIG. 9(a), an internal angle θ of a portion in which the lead wire 200 comes in contact with the lead wire drawn out part 400 may be set to lie within a range, wherein the internal angle θ is in a range of more than 90 degrees and less than 180 degrees.

Accordingly, a possibility that disconnection may occur due to forced bending of a lead wire, as in the lead wire 200 of a conventional stator slot temperature sensor assembly which is bent and formed by force, can be reduced.

Furthermore, a pair of the elements 100 may be configured to have resistance changing depending on a temperature.

Furthermore, the element 100 and the lead wire 200 may be coupled through the medium of the flexible substrate 150. The flexible substrate 150 may be equipped with a wiring pattern in which the element 100 and the lead wire 200 are coupled on a surface of an insulating base.

Furthermore, the lead wire drawn out part 400 and the external conducting wire connected to the external circuit may be coupled through the medium of the flexible substrate 150. The flexible substrate 150 may be equipped with a wiring pattern in which the element 100 and the lead wire 200 are coupled on a surface of an insulating base.

Furthermore, the element 100 and the lead wire 200 may be coupled through the medium of the flexible substrate 150. The flexible substrate 150 may comprise a wiring pattern in which the element 100 and the lead wire 200 are coupled on a surface of an insulating base. In this case, the insulating film 154 may be attached to a surface of the wiring pattern.

Furthermore, the lead wire drawn out part 400 and the external conducting wire connected to the external circuit may be coupled through the medium of the flexible substrate 150. The flexible substrate 150 may be equipped with a wiring pattern in which the element 100 and the lead wire 200 are coupled on a surface of an insulating base. In this case, the insulating film 154 may be attached to a surface of the wiring pattern.

Furthermore, the element 100 and the lead wire 200 may be coupled through the medium of the flexible substrate 150. In this case, the flexible substrate 150 is a flexible printed circuit board, and may comprise a wiring pattern in which the element 100 and the lead wire 200 are coupled on a surface of an insulating base. Etching holes for preventing the disconnection of the wiring pattern attributable to a tensile load may be formed in the wiring pattern.

Furthermore, the lead wire drawn out part 400 and an external conducting wire connected to an external circuit may be coupled through the medium of the flexible substrate 150. The flexible substrate 150 is a flexible printed circuit board, and may comprise a wiring pattern in which the element 100 and the lead wire 200 are coupled on a surface of an insulating base. Etching holes for preventing the disconnection of the wiring pattern attributable to a tensile load may be formed in the wiring pattern.

A method of manufacturing the stator slot temperature sensor assembly is described below.

Figure 10:
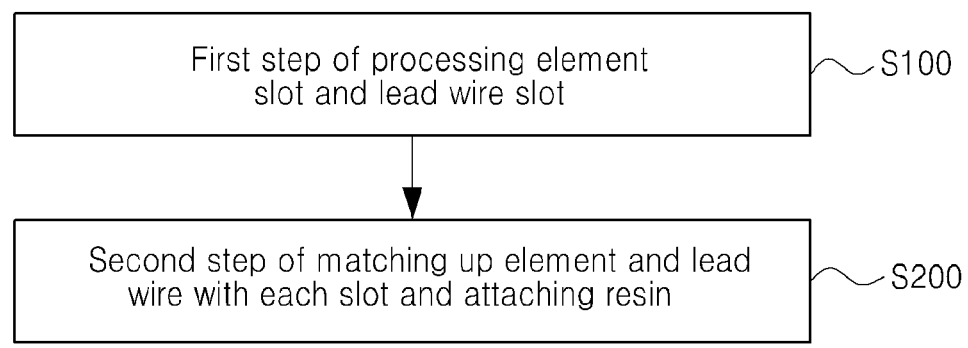
FIG. 10 is a flow chart illustrating a method of manufacturing the stator slot temperature sensor assembly in accordance with an embodiment of the present disclosure.

FIG. 10 shows a method of manufacturing the stator slot temperature sensor assembly in accordance with an embodiment of the present disclosure.

Referring to FIG. 10, the method of manufacturing the stator slot temperature sensor assembly in accordance with an embodiment of the present disclosure comprises processing the element slot and the lead wire slot in the laminate in the length direction of the base at step S100 and matching up the element with the element slot, matching up the lead wire with the lead wire slot, and attaching the resin on top of the element and on top of the lead wire at step S200. In an exemplary embodiment, the second step may comprise aligning the lead wire with the lead wire slot.

At step S200, the element may be connected to a terminal at one end of the wiring pattern of the flexible printed circuit board by soldering, and the lead wire may be connected to a terminal at the other end of the wiring pattern of the flexible printed circuit board by soldering.

The method of manufacturing the stator slot temperature sensor assembly may comprise processing polymer into the insulating base, stacking electrolytic copper foils on the insulating base with an adhesive layer interposed between the electrolytic copper foils on the insulating base through pressurization and heating, processing the wiring pattern comprising the holes by etching using photolithography, and attaching the insulating film to a top surface of the wiring pattern other than the terminals.

The method may comprise forming an internal angle of a section communicating with the outside of the laminate of the lead wire slot and the laminate so that the internal angle is in a range of more than 90 degrees and less than 180 degrees.

Furthermore, the method may comprise forming the section communicating with the outside of the laminate of the lead wire slot so that the section has a specified level of curvature, or more.

The embodiments of the present disclosure can improve the shape of the laminate and can prevent disconnection between the lead wire and the element by mediating the connection unit between the lead wires or between the lead wire and the element using the flexible substrate and changing the angle of the lead wire extended to the drawn out part.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. A stator slot temperature sensor assembly placed between a plurality of stator coils stacked in a stator slot, the stator slot temperature sensor assembly comprising:
   a resistance element that changes in resistance depending on temperature;
   a lead wire connected to the resistance element;
   a laminate that surrounds the resistance element and the lead wire;
   a lead wire drawn out part extended and protruded from the lead wire to an outside of the laminate; and
   a flexible substrate comprising:
      a wiring pattern; and
      a plurality of holes for preventing disconnection of the wiring pattern attributable to a tensile load, formed in the wiring pattern.

2. The stator slot temperature sensor assembly of claim 1, wherein the resistance element is of a pair of resistance elements and the lead wire is of a pair of lead wires, the laminate comprising:
   element slots respectively configured to accommodate the pair of resistance elements; and
   lead wire slots extended from the element slots and respectively configured to accommodate the pair of lead wires.

3. The stator slot temperature sensor assembly of claim 2, wherein:
   the pair of resistance elements are pressed in the element slots,
   resin for fixing the pair of resistance elements is disposed over the pair of resistance elements,
   the pair of lead wires are pressed in the lead wire slots, and
   resin for fixing the pair of lead wires is disposed over the pair of lead wires.

4. The stator slot temperature sensor assembly of claim 1, wherein the resistance element and the lead wire are coupled through the flexible substrate.

5. The stator slot temperature sensor assembly of claim 4, wherein the resistance element is directly coupled to the wiring pattern and the lead wire is directly coupled to the wiring pattern, on a surface of an insulating base.

6. The stator slot temperature sensor assembly of claim 4, wherein
   the resistance element is directly coupled to the wiring pattern and the lead wire is directly coupled to the wiring pattern, on a surface of an insulating base, further comprising:
   an insulating film attached to a surface of the wiring pattern.

7. The stator slot temperature sensor assembly of claim 4, wherein:
   the flexible substrate further comprises
   a flexible printed circuit board;
   the resistance element is directly coupled to the wiring pattern and the lead wire is directly coupled to the wiring pattern, on a surface of an insulating base; and
   the plurality of holes are etching holes.

8. The stator slot temperature sensor assembly of claim 1, wherein the lead wire drawn out part and an external conducting wire connected to an external circuit are coupled through the flexible substrate.

9. The stator slot temperature sensor assembly of claim 8, wherein the resistance element is directly coupled to the wiring pattern and the lead wire is directly coupled to the wiring pattern, on a surface of an insulating base.

10. The stator slot temperature sensor assembly of claim 8, wherein
    the resistance element is directly coupled to the wiring pattern and the lead wire is directly coupled to the wiring pattern, on a surface of an insulating base, further comprising:
    an insulating film attached to a surface of the wiring pattern.

11. The stator slot temperature sensor assembly of claim 8, wherein:
    the flexible substrate further comprises
    a flexible printed circuit board;
    the resistance element is directly coupled to the wiring pattern and the lead wire is directly coupled to the wiring pattern, on a surface of an insulating base; and
    the plurality of holes are etching holes.

12. The stator slot temperature sensor assembly of claim 1, wherein the lead wire has curvature and is extended to the lead wire drawn out part.

13. The stator slot temperature sensor assembly of claim 12, wherein the lead wire has a radius of curvature in a range from about 5 mm to about 15 mm.

14. The stator slot temperature sensor assembly of claim 1, wherein an internal angle θ of a portion in which the lead wire comes in contact with the lead wire drawn out part is in a range of more than 90 degrees and less than 180 degrees.

15. The stator slot temperature sensor assembly of claim 1, wherein the resistance element is of a pair of resistance elements which change in resistance depending on temperature.

* * * * *